(12) United States Patent
Rumreich et al.

(10) Patent No.: US 7,599,604 B2
(45) Date of Patent: Oct. 6, 2009

(54) ASYNCHRONOUS COPY PROTECTION DETECTOR

(75) Inventors: Mark Francis Rumreich, Indianapolis, IN (US); John Alan Hague, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1053 days.

(21) Appl. No.: 10/170,955

(22) Filed: Jun. 13, 2002

(65) Prior Publication Data

US 2003/0113101 A1    Jun. 19, 2003

Related U.S. Application Data

(60) Provisional application No. 60/340,555, filed on Dec. 14, 2001.

(51) Int. Cl.
*H04N 7/00* (2006.01)
*H04N 7/087* (2006.01)
*H04N 5/91* (2006.01)

(52) U.S. Cl. .......................... 386/95; 386/84
(58) Field of Classification Search .................. 386/66, 386/1, 94, 60, 84, 95; 380/218, 221, 203, 380/204, 224; 348/476, 478, 465, 525
See application file for complete search history.

(56) References Cited

U.S. PATENT DOCUMENTS

| | | | | |
|---|---|---|---|---|
| 5,179,452 A | | 1/1993 | Takahashi | 358/335 |
| 5,442,405 A | * | 8/1995 | Taniguchi et al. | 348/525 |
| 5,907,655 A | | 5/1999 | Oguro | 386/94 |
| 5,966,119 A | | 10/1999 | Hwang | 345/213 |
| 6,055,019 A | * | 4/2000 | Takahashi | 348/453 |
| 2002/0085717 A1 | * | 7/2002 | Quan | 380/218 |

FOREIGN PATENT DOCUMENTS

JP   06350592   12/1994
JP   08167252   6/1998

OTHER PUBLICATIONS

Patent Abstracts of Japan & JP200050200 (Suzuki) of Feb. 18, 2000.
International Search Report completed on Mar. 18, 2003.

\* cited by examiner

*Primary Examiner*—Thai Tran
*Assistant Examiner*—Hung Q Dang
(74) *Attorney, Agent, or Firm*—Robert D. Shedd; Joseph J. Opalach; Brian J. Cromarty

(57) ABSTRACT

A video system (100) includes detection circuitry (200A-200C) operative to detect pseudo-synchronization pulses within a composite synchronization signal in dependence upon at least one timing signal. Timing circuitry (200D-200F) is operative to generate the at least one timing signal without utilizing synchronization information within the composite synchronization signal.

18 Claims, 6 Drawing Sheets

ASYNCHRONOUS COPY PROTECTION DETECTOR

This application claims priority to and all benefits accruing from a provisional application filed in the United States Patent and Trademark Office on Dec. 14, 2001, and there assigned Ser. No. 60/340,555.

BACKGROUND OF THE INVENTION

1. Field of the Invention

The present invention generally relates to video systems, and more particularly, to an asynchronous copy protection detector for use in such video systems that is capable of, among other things, detecting the presence of pseudo-synchronization pulses in video signals without utilizing horizontal and/or vertical synchronization signals.

2. Background Information

Copy protection techniques are often utilized in the video industry to prevent the production of unauthorized video copies. One such copy protection technique involves inserting pseudo-synchronization pulses on certain lines of each video field. When video information including such pulses is copied, the pulses cause synchronization problems to occur in the resultant copy. Products enabling the aforementioned type of copy protection are commercially-available from companies such as Macrovision.

In many video systems, it is necessary to detect the presence of pseudo-synchronization pulses in video signals in order to inhibit the recording process. For example, some video systems may strip such pseudo-synchronization pulses from video signals during certain signal processing functions. However, if such video signals having the pseudo-synchronization pulses stripped therefrom are to be output from the video system for a recording operation, the pseudo-synchronization pulses must first be re-inserted into the video signals so that any resultant copy is copy protected. Accordingly, it is often necessary for video systems to detect the presence of such pseudo-synchronization pulses in video signals.

In certain existing video systems, circuitry for detecting the presence of pseudo-synchronization pulses is included. In particular, certain video systems include video processing integrated circuits ("ICs") having horizontal and vertical synchronization circuitry, such as horizontal phase locked loops ("HPLLs"), line counters, and vertical synchronization detectors. Such synchronization circuitry is included, for example, in the Phillips model SAF7113H video input processor IC. The synchronization circuitry included in this type of IC utilizes the horizontal and vertical synchronization signals included in a composite video signal. Accordingly, such circuitry makes the detection of pseudo-synchronization pulses a relatively simple matter since the horizontal and vertical synchronization signals provide stable reference timing points. However, when the detection of pseudo-synchronization pulses is required in a video system lacking the aforementioned type of synchronization circuitry, the cost of adding such circuitry can be prohibitive.

Accordingly, there is a need for a video system that avoids the aforementioned problems, and is therefore capable of detecting the presence of pseudo-synchronization pulses in video signals without requiring costly circuitry, or utilizing the horizontal and/or vertical synchronization signals included in a composite synchronization signal. The present invention addresses these and other issues.

SUMMARY OF THE INVENTION

In accordance with the present invention, a video system comprises detection circuitry and timing circuitry. The detection circuitry is operative to detect pseudo-synchronization pulses within a composite synchronization signal in dependence upon at least one timing signal. The timing circuitry is operative to generate the at least one timing signal without utilizing synchronization information within the composite synchronization signal.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
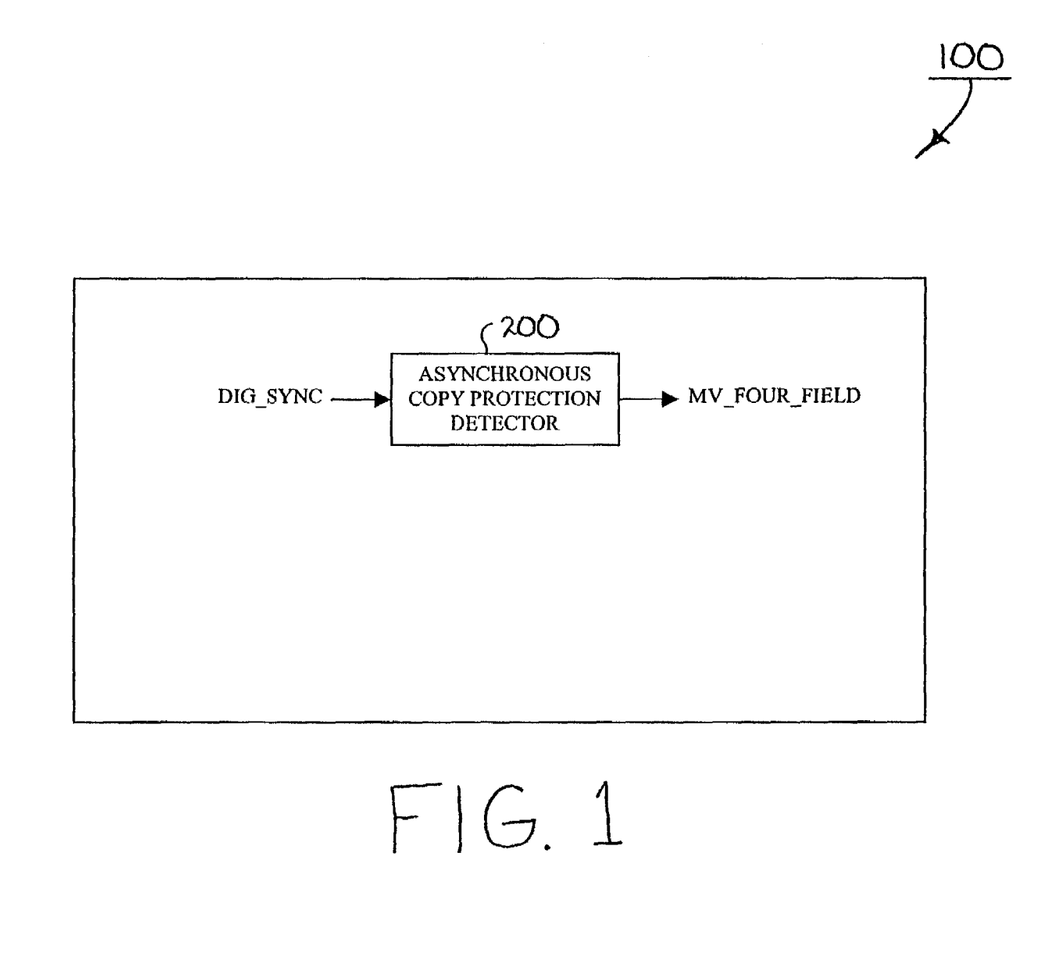
FIG. 1 is an exemplary video system including an asynchronous copy protection detector according to principles of the present invention.

Referring now to the drawings, and more particularly to FIG. 1, a diagram of an exemplary video system 100 including an asynchronous copy protection detector 200 according to principles of the present invention is shown. Video system 100 of FIG. 1 may be embodied, for example, as a television signal receiver, a set-top box, a video cassette recorder ("VCR"), a digital versatile disk ("DVD") player, a video game box, a personal video recorder ("PVR") or any other system having a video processing function.

In FIG. 1, video system 100 is operative to receive a video signal from an external source (not shown), and extract therefrom a composite synchronization signal. Video system 100 includes asynchronous copy protection detector 200 for receiving and processing the composite synchronization signal, DIG_SYNC, in order to detect therein the presence of pseudo-synchronization pulses. As previously indicated herein, such pseudo-synchronization pulses are often encoded in video signals as a means for providing copy protection. Asynchronous copy protection detector 200 generates an output signal, MV_FOUR_FIELD, indicative of the results of its detection operation. As will be explained herein, asynchronous copy protection detector 200 includes detection circuits 200A to 200C and timing circuits 200D to 200F.

Asynchronous copy protection detector 200 may, for example, be included on one or more ICs. Although not expressly shown in FIG. 1, video system 100 may also include other components, such as other ICs and other electrical and non-electrical components.

As will be explained herein, asynchronous copy protection detector 200 enables video system 100 to detect the presence of pseudo-synchronization pulses in a composite synchronization signal without utilizing synchronization information within the composite synchronization signal. That is, the operation of asynchronous copy protection detector 200 is not phase and/or frequency locked in a conventional manner to the horizontal and/or vertical synchronization signals. Accordingly, pseudo-synchronization pulses can be detected without using expensive horizontal and/or vertical synchronization circuitry, such as HPLLs, line counters and vertical synchronization detectors.

For purposes of example and explanation only, asynchronous copy protection detector 200 is described herein for detecting a particular copy protection scheme where pseudo-synchronization pulses are inserted in 8 consecutive lines of each video field (e.g., lines 10 to 17 of field 1, and lines 273 to 280 of field 2). The principles of the present invention, however, are not limited only to the detection of this particular copy protection scheme. Accordingly, it will be intuitive to those skilled in the art that the principles of the present invention may also be utilized to detect other copy protection schemes, such as those where pseudo-synchronization pulses are inserted on a different number of lines per video field.

Figure 2:
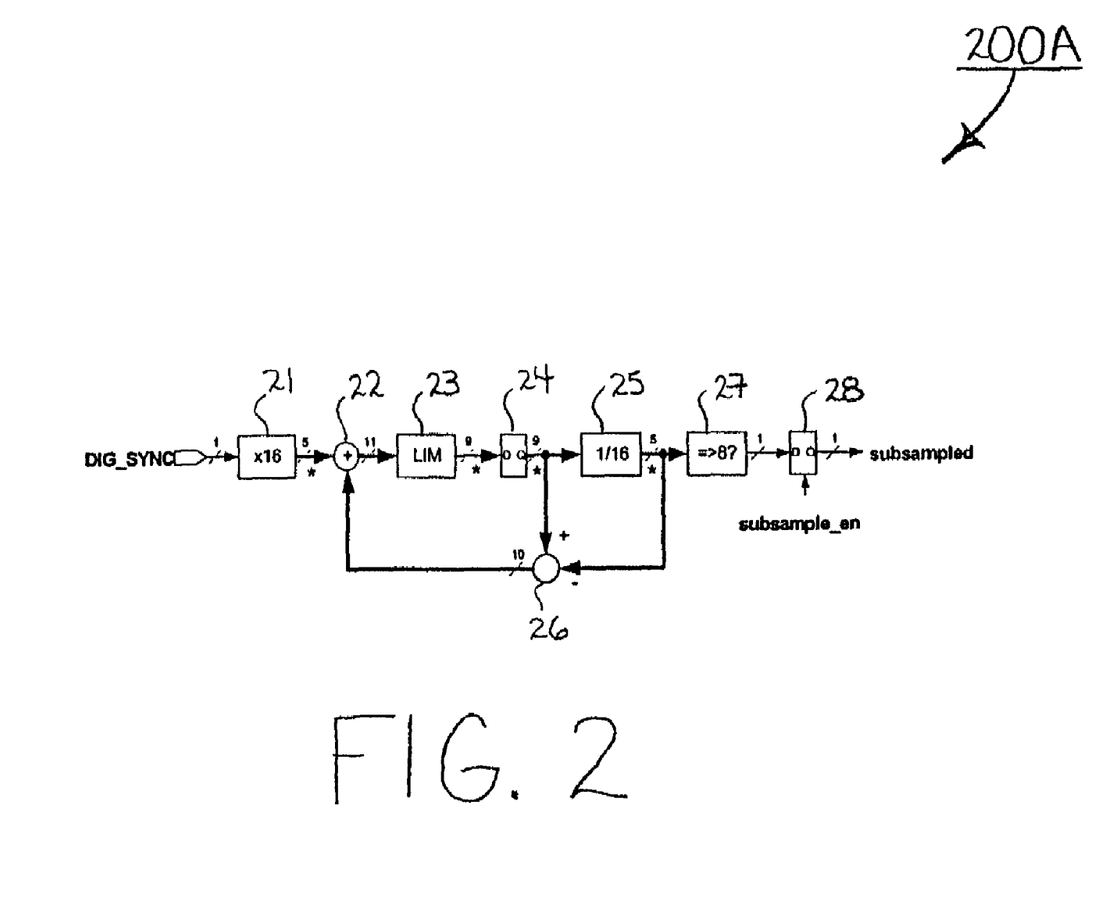
FIG. 2 is a first exemplary detection circuit of the asynchronous copy protection detector of FIG. 1.

Referring to FIG. 2, a first exemplary detection circuit 200A of asynchronous copy protection detector 200 of FIG. 1 is shown. In FIG. 1, circuit 200A operates as a low pass filter/subsampler, and comprises a multiplier 21, an adder 22, a limiter 23, a D-type flip-flip 24, a divider 25, a subtractor 26, a comparator 27, and a D-type flip-flop 28. In FIG. 2, the numbers shown above the signal lines represent the number of bits transmitted on the corresponding signal line in the exemplary embodiment. These numbers are not intended to be limiting in any manner. Also in FIG. 2, the signal lines having an asterisk ("*") adjacent thereto represent unsigned signals (i.e., signals having neither a positive nor negative indicator).

In an exemplary mode of operation, multiplier 21 receives the composite synchronization signal, namely the DIG_SYNC signal, from a source such as a synchronization ("sync") slicer (not shown). As is known in the video arts, the composite synchronization signal includes horizontal and vertical synchronization signals, and is a standard component of an analog video signal. According to an exemplary embodiment, the DIG_SYNC signal is a 1-bit signal represented as a pulse train exhibiting a logic high state for 5 μs and a logic low state for 60 μs during each horizontal line. The DIG_SYNC signal may, for example, be input to multiplier 21 in accordance with a clock frequency of 27 MHz.

Multiplier 21 multiplies the DIG_SYNC signal by a value of 16 to generate and output a multiplied signal. Adder 22 receives the multiplied signal from multiplier 21 and adds thereto a feedback signal to thereby generate and output a sum signal. Limiter 23 receives the sum signal from adder 22 and performs a limiting operation thereon to generate an output signal having a limited value. According to an exemplary embodiment, the output signal of limiter 23 is limited to a value of 511 (i.e., $2^9-1$). D-type flip-flop 24 receives the output signal of limiter 23, and is clocked in accordance with the exemplary clock frequency of 27 MHz to thereby provide an output signal. Divider 25 receives the output signal from D-type flip-flop 24, and according to an exemplary embodiment, divides its value by 16 to thereby generate and output a divided signal. Subtractor 26 receives the output signal from D-type flip-flop 24 and the divided signal from divider 25, and subtracts the value of the divided signal from the value of the output signal of D-type flip-flop to thereby generate and output the feedback signal to adder 22. Comparator 27 also receives the divided signal from divider 25, and according to an exemplary embodiment, determines whether the value of the divided signal is greater than or equal to 8. When the value of the divided signal is greater than or equal to 8, comparator 27 generates an output signal having a logic high state. D-type flip-flop 28 receives the output signal from comparator 27, and is clocked in accordance with a subsample_en signal to thereby output a subsampled signal, which is the output signal of circuit 200A. Further details regarding the subsample_en signal will be provided later herein with reference to FIG. 5A.

Figure 3:
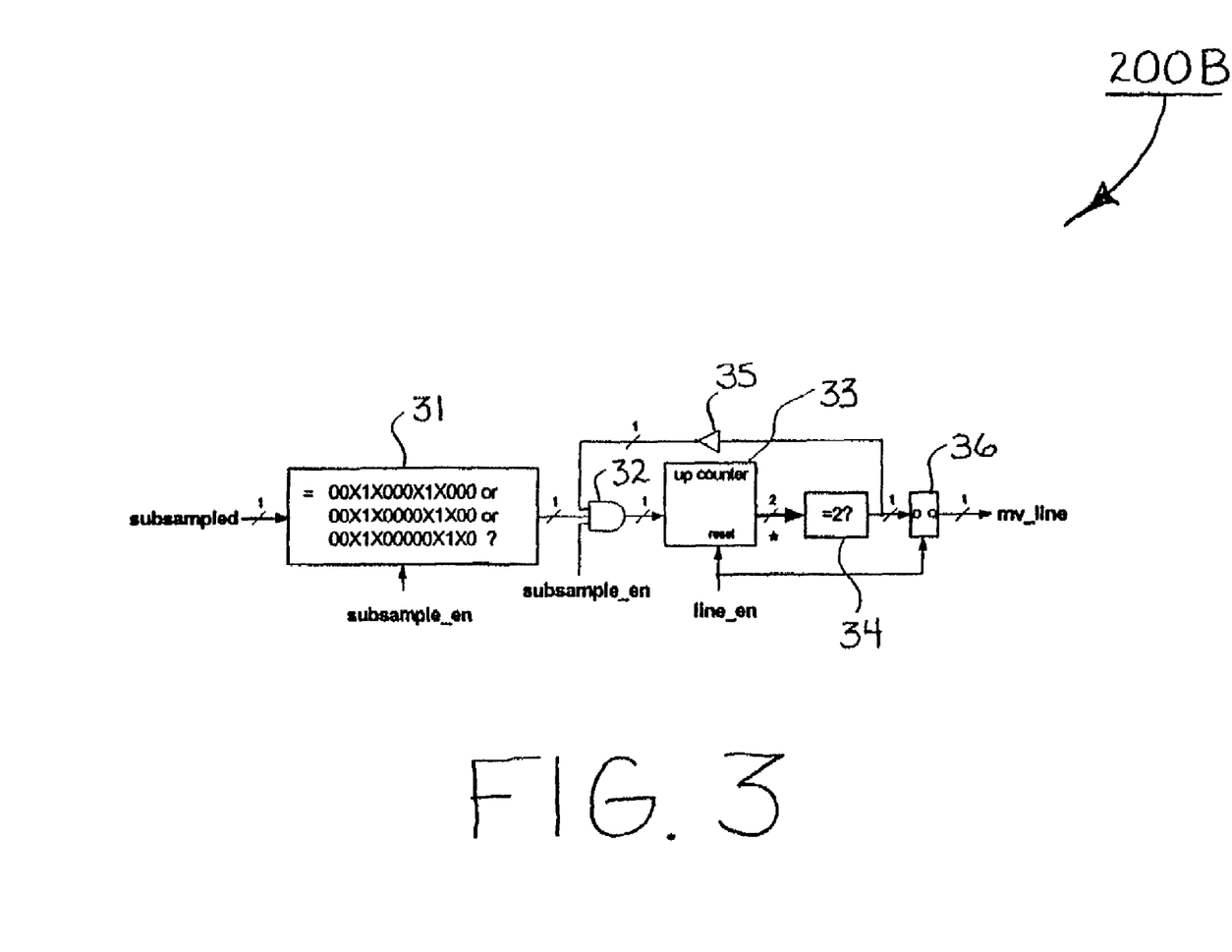
FIG. 3 is a second exemplary detection circuit of the asynchronous copy protection detector of FIG. 1.

Referring to FIG. 3, a second exemplary detection circuit 200B of asynchronous copy protection detector 200 of FIG. 1 is shown. As indicated in FIG. 3, circuit 200B comprises a matched filter 31, an AND gate 32, an up counter 33, a comparator 34, an inverter 35, and a D-type flip-flop 36. In FIG. 3, the numbers shown above the signal lines represent the number of bits transmitted on the corresponding signal line in the exemplary embodiment. These numbers are not intended to be limiting in any manner. Also in FIG. 3, the signal lines having an asterisk ("*") adjacent thereto represent unsigned signals (i.e., signals having neither a positive nor negative indicator).

In an exemplary mode of operation, matched filter 31 receives the subsampled signal output from circuit 200A of asynchronous copy protection detector 200 of FIG. 2. Matched filter 31 compares sequential bits of the subsampled signal to predetermined bit patterns in dependence upon the subsample_en signal. In particular, the predetermined bit patterns each represent a signal profile that corresponds to the presence of 2 pseudo-synchronization pulses. According to an exemplary embodiment, the predetermined bit patterns comprise the following bit sequences: "00X1X000X1X000," "00X1X0000X1X00" and "00X1X00000X1X0" where "X" represents a "don't care" logic state. Accordingly, when sequential bits of the subsampled signal correspond to 1 of the predetermined bit patterns, matched filter 31 generates an output signal in a logic high state to indicate that 2 pseudo-synchronization pulses have been detected within a given horizontal line interval.

AND gate 32 receives the output signal from matched filter 31, the subsample_en signal, and a feedback signal, and performs a logic AND operation thereon to generate an output signal. According to an exemplary embodiment, AND gate 32 generates an output signal in a logic high state when the output signal from matched filter 31 indicates that 2 pseudo-synchronization pulses have been detected within a given time interval that corresponds nominally to a horizontal line interval. Up counter 33 receives the output signal from AND gate 32, and according to an exemplary embodiment, counts the number of logic high signals received from AND gate 32 and outputs a corresponding count signal. In particular, the count signal output from up counter 33 has a count value that represents the number of times matched filter 31 has detected 2 pseudo-synchronization pulses within the given time interval that corresponds nominally to a horizontal line interval. Up counter 33 is reset in dependence upon a line_en signal, which nominally represents a horizontal line interval. Further details regarding the line_en signal will be provided later herein with reference to FIG. 5B.

Comparator 34 receives the count signal from up counter 33, and according to an exemplary embodiment, compares the count value represented by the count signal to a value of 2. That is, comparator 34 determines whether matched filter 31 has twice detected 2 pseudo-synchronization pulses within the given time interval that corresponds nominally to a horizontal line interval. Comparator 34 generates an output signal in a logic high state when the count value represented by the count signal of up counter 33 equals 2. Inverter 35 receives and inverts the output signal of comparator 34 to thereby generate and output the feedback signal to AND gate 32.

D-type flip-flop 36 also receives the output signal of comparator 34, and is clocked in accordance with the line_en signal to thereby output an mv_line signal, which is the output signal of circuit 200B. According to an exemplary embodiment, the mv_line signal exhibits a logic high state when 2 pseudo-synchronization pulses are detected twice during the given time interval that corresponds nominally to a horizontal line interval.

Figure 4:
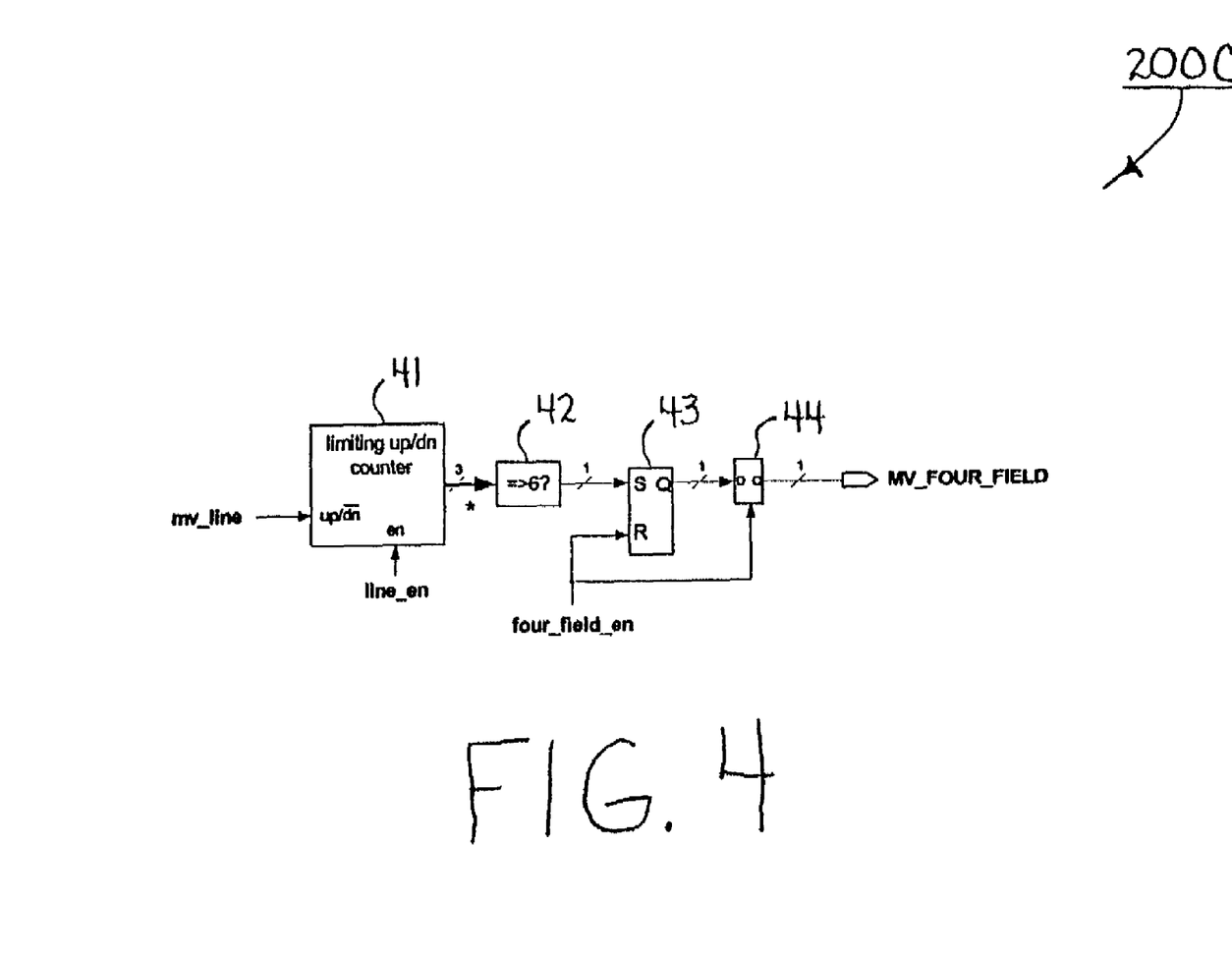
FIG. 4 is a third exemplary detection circuit of the asynchronous copy protection detector of FIG. 1.

Referring to FIG. 4, a third exemplary detection circuit 200C of asynchronous copy protection detector 200 of FIG. 1 is shown. As indicated in FIG. 4, circuit 200C comprises a limiting up/down counter 41, a comparator 42, an SR-type flip-flop 43, and a D-type flip-flop 44. In FIG. 4, the numbers shown above the signal lines represent the number of bits transmitted on the corresponding signal line in the exemplary embodiment. These numbers are not intended to be limiting in any manner. Also in FIG. 4, the signal lines having an asterisk ("*") adjacent thereto represent unsigned signals (i.e., signals having neither a positive nor negative indicator).

In an exemplary mode of operation, limiting up/down counter 41 receives the mv_line signal output from circuit 200B of asynchronous copy protection detector 200 of FIG. 3. Limiting up/down counter 41 is enabled by the line_en signal and counts upwardly or downwardly based on the logic state of the mv_line signal. According to an exemplary embodiment, limiting up/down counter 41 counts upwardly by 1 each time interval the mv_line signal exhibits a logic high state, and counts downwardly by 1 each time interval the mv_line signal exhibits a logic low state. Moreover, the count value of limiting up/down counter 41 is preferably limited to a value from 0 to 7. Limiting up/down counter 41 generates and outputs a count signal having a count value representative of its counting operation.

Comparator 42 receives the count signal from limiting up/down counter 41, and according to an exemplary embodiment, compares the count value represented by the count signal to a value of 6. Comparator 42 generates an output signal in a logic high state when the count value represented by the count signal of limiting up/down counter 41 is greater than or equal to 6. SR-type flip-flop 43 receives the output signal of comparator 42 at its "S" terminal and a four_field_en signal at its "R" terminal, and accordingly generates an output signal. The four_field en signal nominally represents a 4 field interval. Further details regarding the four_field_en signal will be provided later herein with reference to FIG. 5C.

D-type flip-flop 44 receives the output signal of SR-type flip-flop 43, and is clocked in accordance with the four_field_en signal to thereby output an MV_FOUR_FIELD signal, which is the output signal of the asynchronous copy protection detector 200. According to an exemplary embodiment, the MV_FOUR_FIELD signal is updated every 66.75 milliseconds, and exhibits a logic high state when the count value of limiting up/down counter 41 equals or exceeds 6 anytime during a 4 field measurement interval. According to principles of the present invention, when the MV_FOUR_FIELD signal is in a logic high state, pseudo-synchronization pulses are assumed to be present in 8 consecutive lines of each video field.

Figure 5A:
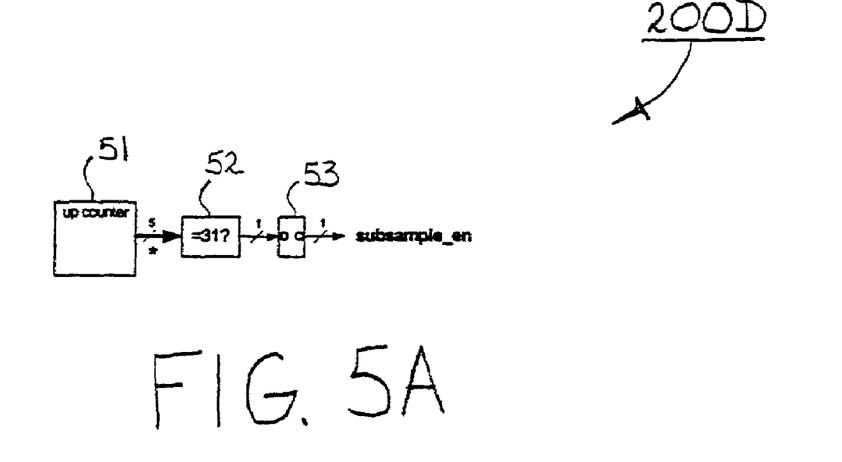
FIGS. 5A to 5C are exemplary timing circuits of the asynchronous copy protection detector of FIG. 1.
Figure 5B:
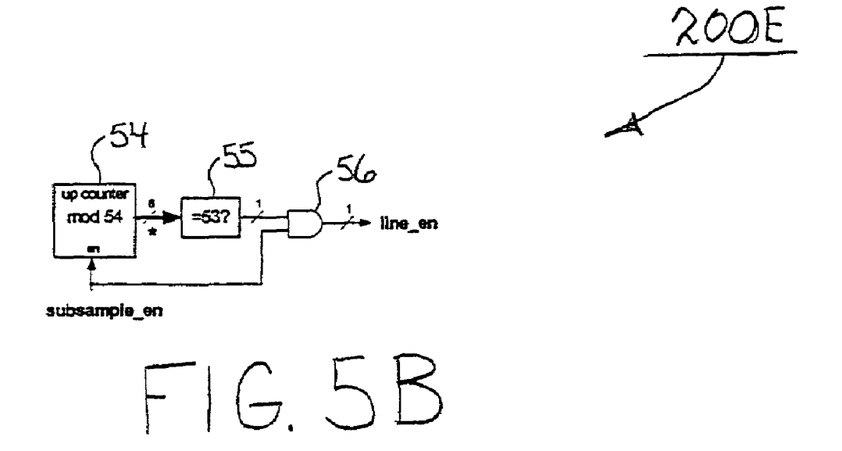
Figure 5C:
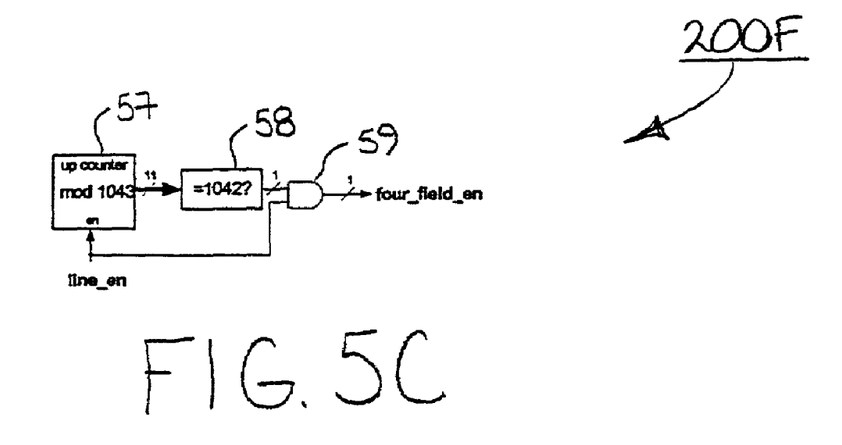

Referring to FIGS. 5A to 5C, exemplary timing circuits 200D to 200F of asynchronous copy protection detector 200 of FIG. 1 are respectively shown. As indicated in FIGS. 5A to 5C, timing circuits 200D to 200F include circuitry for generating the subsample_en signal, the line_en signal, and four_field_en signal, respectively. Further exemplary details regarding timing circuits 200D to 200F will hereinafter be provided.

In FIG. 5A, timing circuit 200D comprises an up counter 51, a comparator 52, and a D-type flip-flop 53. According to an exemplary embodiment, up counter 51 performs an upward counting operation in accordance with a 27 MHz clock frequency to thereby generate a count signal representing a count value. Comparator 52 receives the count signal from up counter 51, and compares the count value represented by the count signal to a value of 31. According to an exemplary embodiment, comparator 52 generates an output signal in a logic high state when the count value represented by the count signal of up counter 51 equals 31. D-type flip-flop 53 receives the output signal from comparator 52, and according to an exemplary embodiment, is clocked in accordance with a 27 MHz clock frequency to thereby output the subsample_en signal. In this manner, the subsample_en signal exhibits a logic high state on every $32^{nd}$ clock cycle of the 27 MHz clock frequency.

In FIG. 5B, timing circuit 200E comprises an up counter 54, a comparator 55, and an AND gate 56. According to an exemplary embodiment, up counter 54 performs a modulo-54 counting operation in accordance with the subsample_en signal generated by timing circuit 500 of FIG. 5A to thereby generate a count signal representing a count value. In particular, up counter 54 counts upwardly by 1 each time the subsample_en signal exhibits a logic high state, and thereby counts from 0 to 53 in a repeated manner (i.e., 0, 1, 2 . . . 53, 0, 1 . . . . 53, 0, 1 . . . ). Comparator 55 receives the count signal from up counter 54, and compares the count value represented by the count signal to a value of 53. Comparator 54 generates an output signal in a logic high state when the count value represented by the count signal of up counter 54 equals 53. AND gate 56 receives the output signal from comparator 55 and the subsample_en signal, and performs a logic AND operation thereon to thereby generate the line_en signal. In this manner, the line_en signal exhibits a logic high state every $54^{th}$ time the subsample_en signal exhibits a logic high state, and thereby approximates an interval corresponding to 1 line of a video field.

In FIG. 5C, timing circuit 200F comprises an up counter 57, a comparator 58, and an AND gate 59. According to an exemplary embodiment, up counter 57 performs a modulo-1043 counting operation in accordance with the line_en signal generated by timing circuit 540 of FIG. 5B to thereby generate a count signal representing a count value. In particular, up counter 57 counts upwardly by 1 each time the line_en signal exhibits a logic high state, and thereby counts from 0 to 1042 in a repeated manner (i.e., 0, 1, 2 . . . 1042, 0, 1 . . . 1042, 0, 1. . . ). Comparator 58 receives the count signal from up counter 57, and compares the count value represented by the count signal to a value of 1042. Comparator 58 generates an output signal in a logic high state when the count value represented by the count signal of up counter 57 equals 1042. AND gate 59 receives the output signal from comparator 58 and the line_en signal, and performs a logic AND operation thereon to thereby generate the four_field_en signal. In this manner, the four_field_en signal exhibits a logic high state every $1043^{rd}$ time the line_en signal exhibits a logic high state, and thereby approximates an interval corresponding to 4 video fields.

Figure 6:
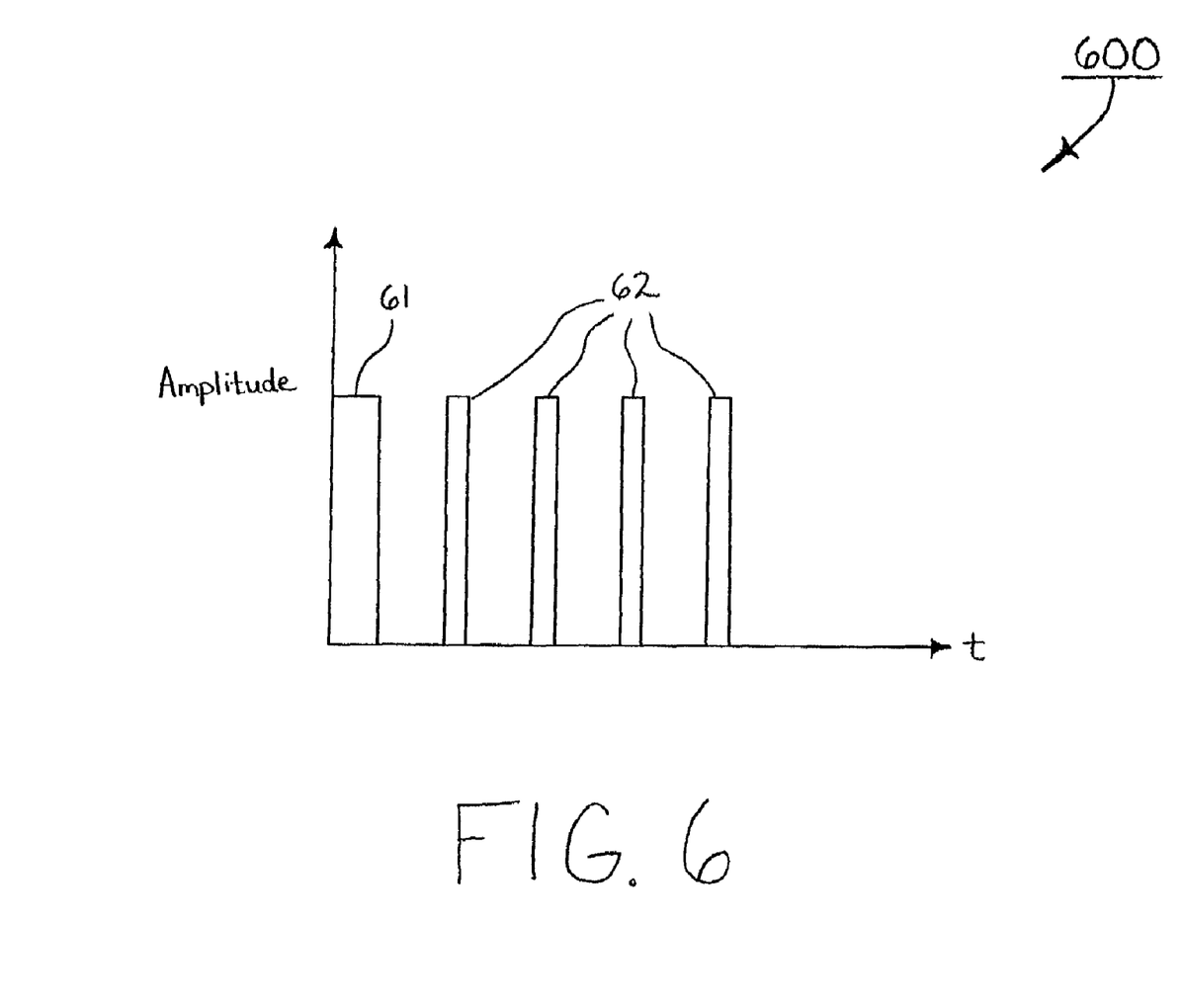
FIG. 6 is an exemplary diagram illustrating a composite synchronization signal including pseudo-synchronization pulses.

Referring to FIG. 6, an exemplary diagram 600 of a composite synchronization signal including pseudo-synchronization pulses is shown. In particular, FIG. 6 illustrates a composite synchronization signal for 1 horizontal line of video including a horizontal synchronization pulse 601 and a plurality of pseudo-synchronization pulses 602. As described herein, such pseudo-synchronization pulses 602 can be detected in accordance with the present invention. In particular, the present invention advantageously detects such pseudo-synchronization pulses 602 in a composite synchronization signal without using synchronization information within the composite synchronization signal. Accordingly, pseudo-synchronization pulses can be detected without using expensive horizontal and/or vertical synchronization circuitry, such as HPLLs, line counters and vertical synchronization detectors. Although the present invention generates timing signals that approximate line and field intervals, such timing signals are in no way locked to horizontal and/or vertical synchronization signals.

The present invention described herein is particularly applicable to various video systems, either with or without display devices. Accordingly, the phrase "video system" as used herein are intended to encompass various types of systems or apparatuses including, but not limited to, television sets or monitors that include a display device, and systems or apparatuses such as a set-top box, VCR, DVD player, video game box, PVR or other video system that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A video system, comprising:
    detection circuitry operative to detect pseudo-synchronization pulses associated with a copy protection scheme within a composite synchronization signal in dependence upon at least two timing signals,
        wherein detection of said pseudo-synchronization pulses associated with a copy protection scheme by said detection circuitry is independent of timing signals generated utilizing synchronization information within the composite synchronization signal, and
        wherein said detection circuitry comprises circuitry to: subsample said composite synchronization signal to create a subsampled signal; perform matched filtering on said subsampled signal; and further process said matched filtered subsampled signal using said at least two timing signals to generate a signal indicating the presence of said pseudo-synchronization pulses associated with a copy protection scheme; and
    timing circuitry operative to generate the at least two timing signals;
    wherein the at least two timing signals are generated independently of said synchronization information within the composite synchronization signal.

2. The video system of claim 1, wherein the detection circuitry includes a filter operative to detect at least one predetermined bit pattern representative of the pseudo-synchronization pulses associated with a copy protection scheme.

3. The video system of claim 1, wherein the detection circuitry is operative to detect pseudo-synchronization pulses associated with a copy protection scheme in each of a plurality of consecutive lines of a video field.

4. The video system of claim 1, wherein one of the timing signals approximates an interval corresponding to one line of a video field.

5. The video system of claim 4, wherein another of the timing signals approximates an interval corresponding to a plurality of video fields.

6. The video system of claim 1, wherein one of the timing signals approximates an interval corresponding to a plurality of video fields.

7. An asynchronous detector, comprising:
    detecting means for detecting pseudo-synchronization pulses associated with a copy protection scheme within a composite synchronization signal in dependence upon at least two timing signals, wherein detection of said pseudo-synchronization pulses associated with a copy protection scheme by said detecting means is independent of timing signals generated utilizing synchronization information within the composite synchronization signal, and wherein said detecting means comprises: means for subsampling said composite synchronization signal to create a subsampled signal; means for performing matched filtering on said subsampled signal; and means for further processing said matched filtered subsampled signal using said at least two timing signals to generate a signal indicating the presence of said pseudo-synchronization pulses associated with a copy protection scheme; and
    means for generating the at least two timing signals;
    wherein the at least two timing signals are generated independently of said synchronization information within the composite synchronization signal.

8. The asynchronous detector of claim 7, wherein the detecting means includes means for detecting at least one predetermined bit pattern representative of the pseudo-synchronization pulses associated with a copy protection scheme.

9. The asynchronous detector of claim 7, wherein the detecting means detects pseudo-synchronization pulses associated with a copy protection scheme in each of a plurality of consecutive lines of a video field.

10. The asynchronous detector of claim 7, wherein one of the timing signals approximates an interval corresponding to one line of a video field.

11. The asynchronous detector of claim 10, wherein another of the timing signals approximates an interval corresponding to a plurality of video fields.

12. The asynchronous detector of claim 7, wherein one of the timing signals approximates an interval corresponding to a plurality of video fields.

13. A method for asynchronously detecting a copy protection scheme in a video system, comprising steps of:
    detecting pseudo-synchronization pulses associated with the copy protection scheme within a composite synchronization signal in dependence upon at least two timing signals, wherein detection of said pseudo-synchronization pulses associated with a copy protection scheme by said detection circuitry is independent of timing signals generated utilizing synchronization information within the composite synchronization signal, and wherein said detecting comprises: subsampling said composite synchronization signal to create a subsampled signal; performing matched filtering on said subsampled signal; and further processing said matched filtered subsampled signal using said at least two timing signals to generate a signal indicating the presence of said pseudo-synchronization pulses associated with a copy protection scheme; and generating the at least two timing signals independently of said synchronization information within the composite synchronization signal.

14. The method of claim 13, wherein the detecting step comprises detecting at least one predetermined bit pattern representative of the pseudo-synchronization pulses associated with a copy protection scheme.

15. The method of claim 13, wherein the detecting step comprises detecting pseudo-synchronization pulses associated with a copy protection scheme in each of a plurality of consecutive lines of a video field.

16. The method of claim 13, wherein one of the timing signals approximates an interval corresponding to one line of a video field.

17. The method of claim 16, wherein another of the timing signals-approximates an interval corresponding to a plurality of video fields.

18. The method of claim 13, wherein one of the timing signals approximates an interval corresponding to a plurality of video fields.

* * * * *

UNITED STATES PATENT AND TRADEMARK OFFICE
CERTIFICATE OF CORRECTION

PATENT NO. : 7,599,604 B2  Page 1 of 1
APPLICATION NO. : 10/170955
DATED : October 6, 2009
INVENTOR(S) : Rumreich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Twenty-eighth Day of September, 2010

David J. Kappos
*Director of the United States Patent and Trademark Office*